(12) United States Patent
Duke

(10) Patent No.: US 11,427,111 B2
(45) Date of Patent: Aug. 30, 2022

(54) LATCH FOR SLIDING VEHICLE SEAT ADJUSTMENT

(71) Applicant: Lippert Components, Inc., Elkhart, IN (US)

(72) Inventor: Michael Duke, Edwardsburg, MI (US)

(73) Assignee: Lippert Components, Inc., Elkhart, IN (US)

( * ) Notice: Subject to any disclaimer, the term of this patent is extended or adjusted under 35 U.S.C. 154(b) by 0 days.

(21) Appl. No.: 17/226,314

(22) Filed: Apr. 9, 2021

(65) Prior Publication Data

US 2021/0323447 A1    Oct. 21, 2021

Related U.S. Application Data

(60) Provisional application No. 63/010,346, filed on Apr. 15, 2020.

(51) Int. Cl.
*B60N 2/08*    (2006.01)

(52) U.S. Cl.
CPC ......... *B60N 2/0806* (2013.01); *B60N 2/0818* (2013.01)

(58) Field of Classification Search
CPC .... B60N 2/0806; B60N 2/123; B60N 2/0818; B60N 2/0715; B60N 2/0705; B60N 2/085
See application file for complete search history.

(56) References Cited

U.S. PATENT DOCUMENTS

| | | |
|---|---|---|
| 4,109,973 A | 8/1978 | Terada |
| 4,281,871 A | 8/1981 | Grittner et al. |
| 4,881,827 A | 11/1989 | Borlinghaus et al. |
| 5,273,241 A | 12/1993 | Droulon |
| 5,407,165 A | 4/1995 | Balocke |
| 5,695,247 A | 12/1997 | Premji |
| 5,820,216 A | 10/1998 | Feuillet |
| 6,616,233 B1 | 9/2003 | Debus et al. |
| 8,042,855 B2 | 10/2011 | Blatseas et al. |
| 2012/0298828 A1* | 11/2012 | Wakayama .......... B60N 2/0818 248/429 |
| 2012/0299361 A1* | 11/2012 | Domoto ............... B60N 2/0705 297/463.1 |
| 2015/0258916 A1* | 9/2015 | Kim ..................... B60N 2/0868 248/429 |

\* cited by examiner

*Primary Examiner* — Sarah B McPartlin
(74) *Attorney, Agent, or Firm* — Nixon & Vanderhye P.C.

(57) ABSTRACT

A latch assembly for a sliding seat includes a handle and a latch body fixed to the handle. The latch body is securable pivotally to one of an upper rail and a lower rail of the sliding seat. The latch body is pivotable via the handle between a locked position and an unlocked position. The latch body includes teeth openings arranged along a lengthwise dimension, where the teeth openings sequentially decrease in size. The assembly essentially eliminates problems associated with skip-locking and chucking in existing designs.

18 Claims, 18 Drawing Sheets

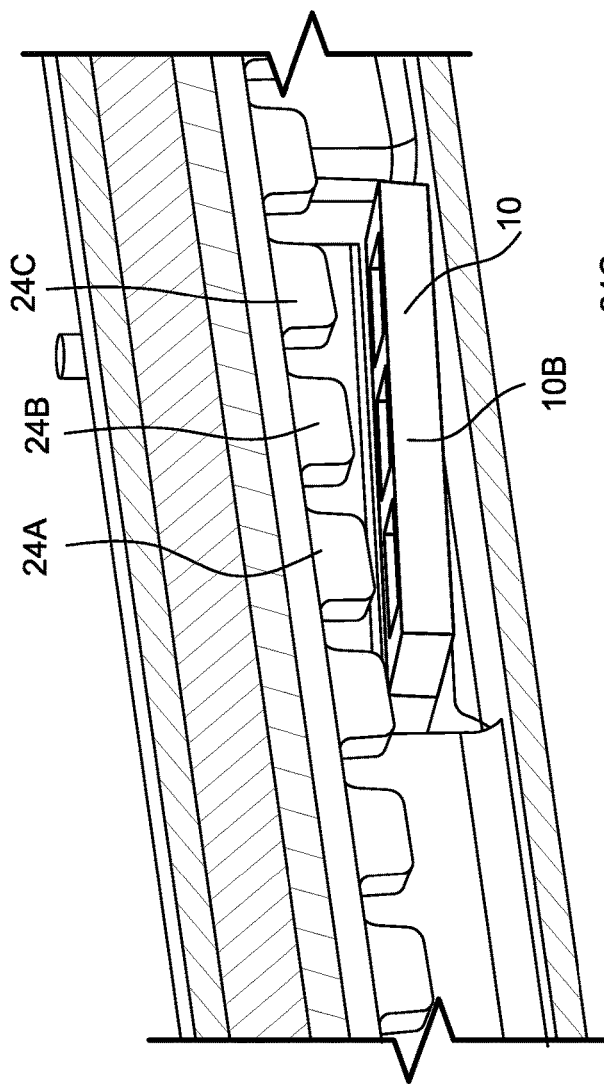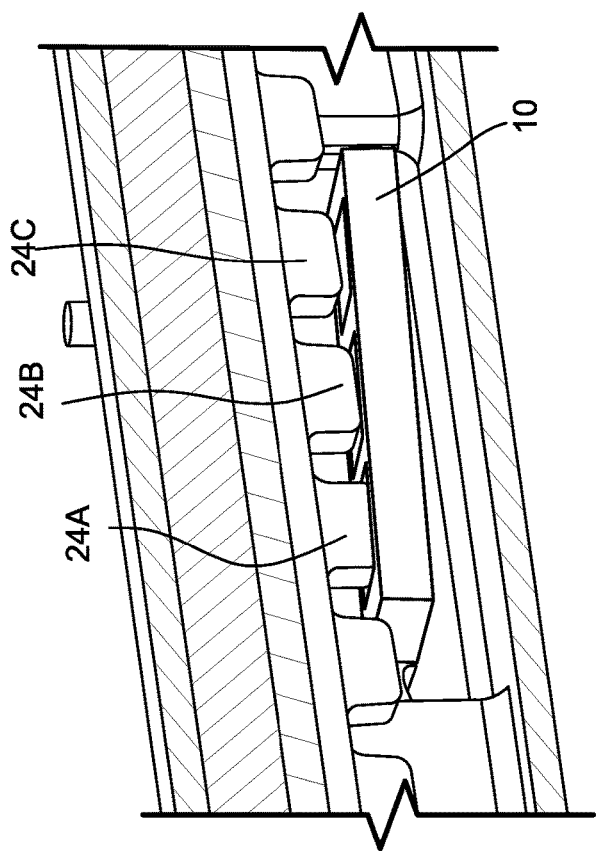

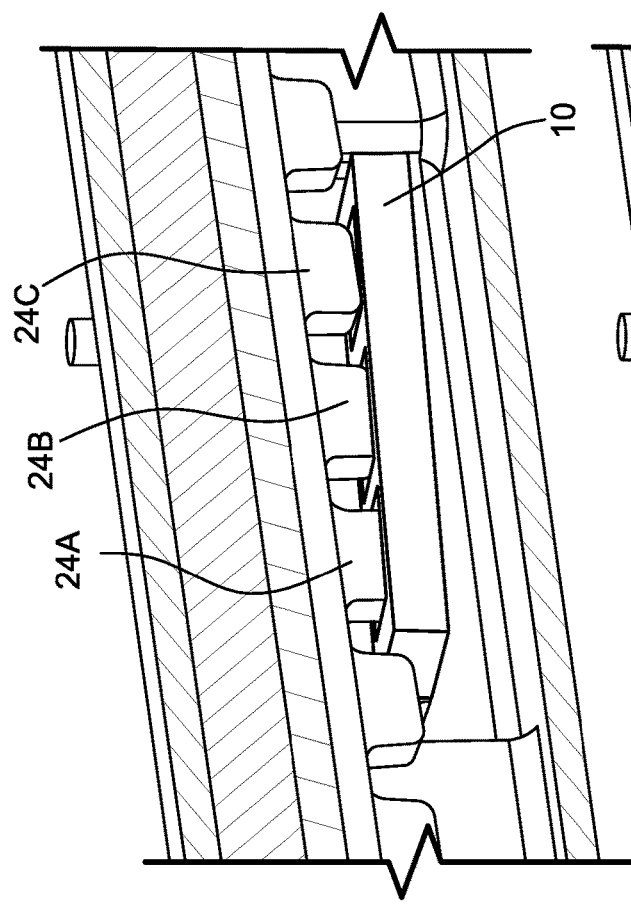
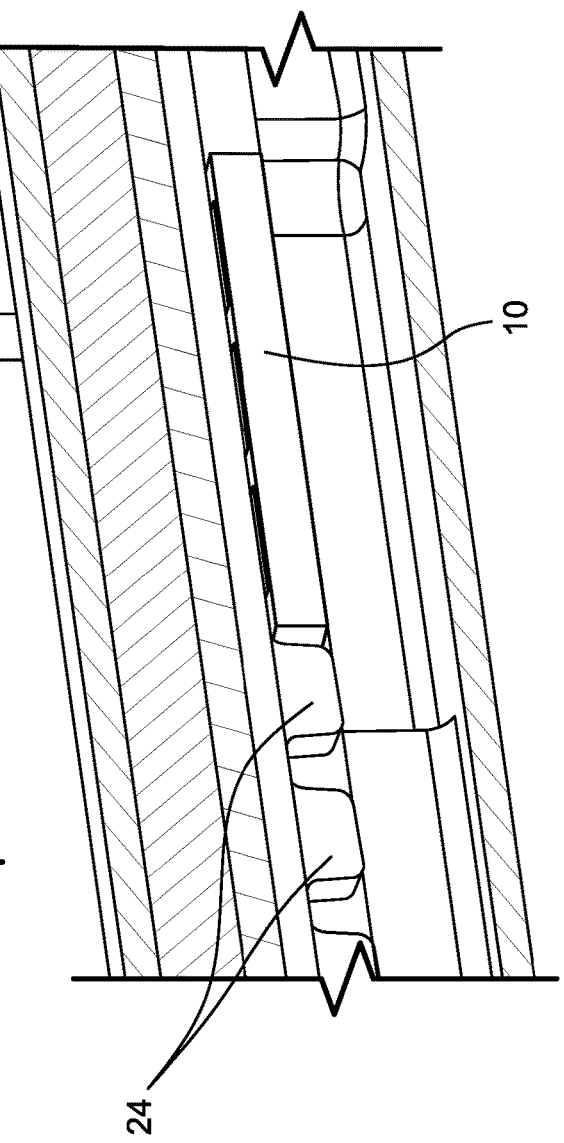

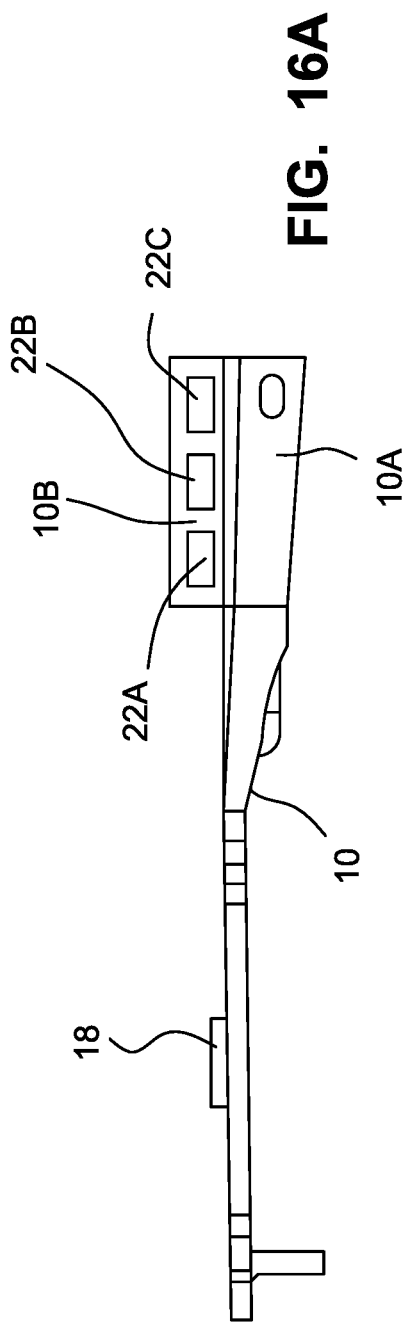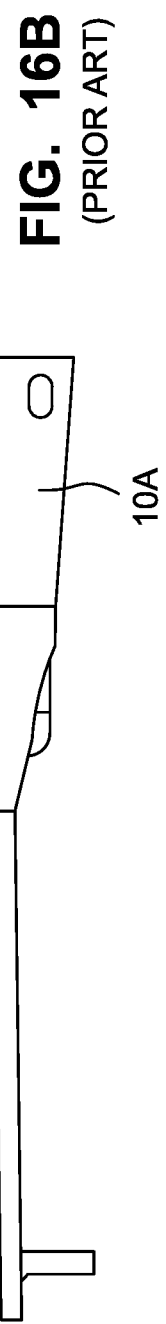
FIG. 16A
FIG. 16B (PRIOR ART)

LATCH FOR SLIDING VEHICLE SEAT ADJUSTMENT

CROSS-REFERENCES TO RELATED APPLICATIONS

This application claims the benefit of U.S. Provisional Patent Application Ser. No. 63/010,346, filed Apr. 15, 2020, the entire content of which is herein incorporated by reference.

STATEMENT REGARDING FEDERALLY SPONSORED RESEARCH OR DEVELOPMENT (NOT APPLICABLE)

BACKGROUND

The front seats in many types of vehicles are commonly mounted for forward and rearward adjustment to accommodate different sized drivers and passengers. The base of the seat is mounted on left and right upper slide rails, which in turn are mounted on left and right lower slide rails secured to the floor of the vehicle. Each of the lower slide rails has a plurality of teeth, and the upper rails each have a latch for selectively engaging the teeth. The latches are pivotally mounted to the upper rails and are pivotal between locked and unlocked positions by a release handle beneath a forward portion of the seat base. Each latch has a series of identical holes sized to engage the teeth in a locked position and disengage the teeth in an unlocked position.

A common problem with the conventional seat adjustment is "skip-locking" wherein the latches fail to properly engage the teeth when the seat is rapidly moved to a fore or aft position. Such skip locking is a manufacturing defect which normally leads to a rejection of the manufactured seat.

Another problem with conventional adjustable seats is "chucking," where the tolerance between the latch holes and the teeth is too great and the seat feels loose, even after being locked in a desired position. This is another manufacturing defect, resulting in rejection of the adjustable seat assembly.

SUMMARY

Therefore, there is a need for an improved latch mechanism for slidably adjustable seats which overcomes the problems of the prior art.

Accordingly, an objective of the described embodiments is the provision of an approved latch for a sliding vehicle seat which eliminates skip locking and chucking. Another objective is the provision of a latch for securely or more precisely receiving the teeth on the lower rails of a sliding vehicle seat assembly, where the teeth holes in the latches are progressively smaller in length.

A further objective of the present invention is the provision of sliding seat latches having holes for releasably engaging teeth, where the first hole is approximately 13% longer than the last hole. In other embodiments, the first hole may be any value greater than 5% longer than the last hole. Still another objective of the described embodiments is the provision of an improved latch for a sliding vehicle seat adjuster that is economical to manufacture, durable, and safe in use.

In an exemplary embodiment, a latch assembly is provided for locking a sliding seat in a selected position, where the seat includes a base mounted on at least one upper rail which is slidably mounted on at least one lower rail. The latch assembly includes a latch body having a plurality of openings and being configured for mounting pivotally on one of the at least one upper rail and at least one lower rail. A plurality of teeth are disposed on the other of the at least one upper rail and at least one lower rail, where the plurality of openings sequentially receive the teeth as the latch body pivots from an unlocked position to a locked position. The openings have sequentially smaller dimensions.

The plurality of openings may include a first one of the openings which may be greater than 5% longer than a last one of the openings. The latch body may be configured for mounting pivotally to the at least one upper rail, and the plurality of teeth may be disposed on the at least one lower rail. The latch body may include an engagement portion containing the plurality of openings and a lever portion configured for limiting a pivot range of the latch body. in this context, the latch assembly may further include a slide tab in the one of the at least one upper rail and at least one lower rail in which the latch body may be configured for mounting pivotally, where the lever portion of the latch body engages the slide tab in the unlocked position.

The latch body may be secured to an elongated handle for pivoting the latch body between the unlocked position and the locked position. The latch body may have three of the openings. The plurality of openings may have uniform width and varying length. The latch body may be biased toward the locked position.

In another exemplary embodiment, a latch assembly for a sliding seat with an upper rail fixed to the seat and slidably mounted on a lower rail fixed to a floor includes a handle, and a latch body fixed to the handle and securable pivotally to one of the upper rail and the lower rail. The latch body is pivotable via the handle between a locked position and an unlocked position. The latch body includes teeth openings arranged along a lengthwise dimension, where the teeth openings sequentially decrease in size.

The latch body may be biased toward the locked position. The latch body may include engagement features to which the handle is fixed. In this context, the engagement features may be disposed on opposite sides of a latch body pivot point. In some embodiments, the handle and the latch body are monolithic. The latch body may include an engagement portion containing the teeth openings and a lever portion configured for limiting a pivot range of the latch body. In this context, a slide tab may be provided in the one of the upper rail and the lower rail in which the latch body is pivotally secured, where the lever portion of the latch body engages the slide tab in the unlocked position.

In yet another exemplary embodiment, an adjustable frame for a vehicle seat includes a lower rail having a plurality of teeth and adapted to be secured to a vehicle floor, an upper rail slidably mounted on the lower rail, a base fixed to the upper rail to support the vehicle seat, a latch pivotally mounted to the upper rail and having a plurality of openings to releasably receive the teeth, and a handle connected to the latch to pivot the latch between a locked position engaging the teeth and an unlocked position disengaged from the teeth. The plurality of openings are progressively smaller in dimension.

The adjustable frame may include three openings, where the largest opening is a forward-most opening.

BRIEF DESCRIPTION OF THE DRAWINGS

These and other aspects and advantages will be described in detail with reference to the accompanying drawings, in which:

FIGS. 13A, 13B, 13C, and 13D are a series of perspective views showing the latch moving sequentially from an unlocked position disengaged from the teeth to a locked position fully engaged with the teeth;

FIGS. 16A and 16B are top plan views of the improved latch and a conventional latch, respectively.

DETAILED DESCRIPTION

Figure 1:
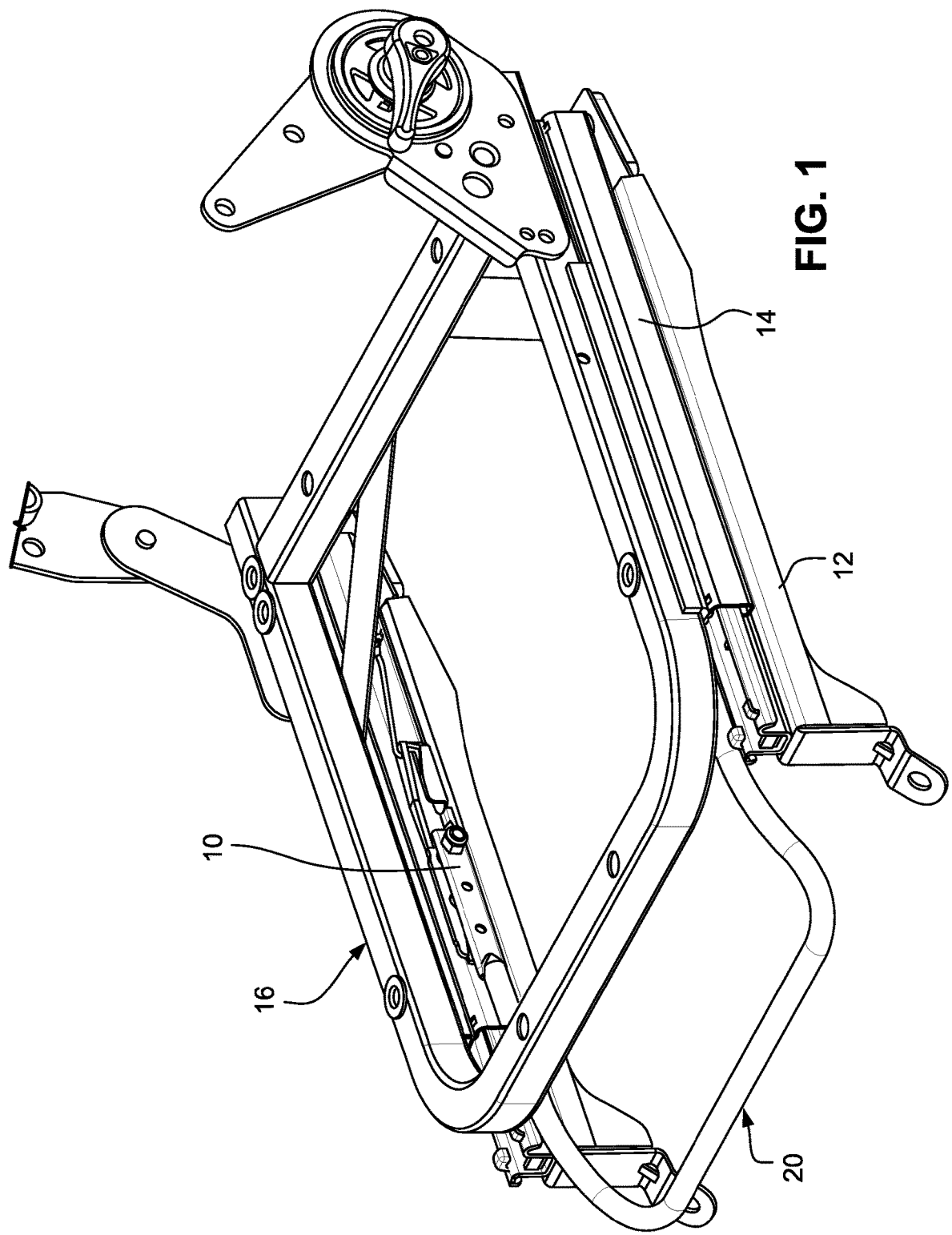
FIG. 1 is a perspective view of a sliding seat adjuster assembly for a vehicle seat having the latches of the described embodiments.
Figure 2:
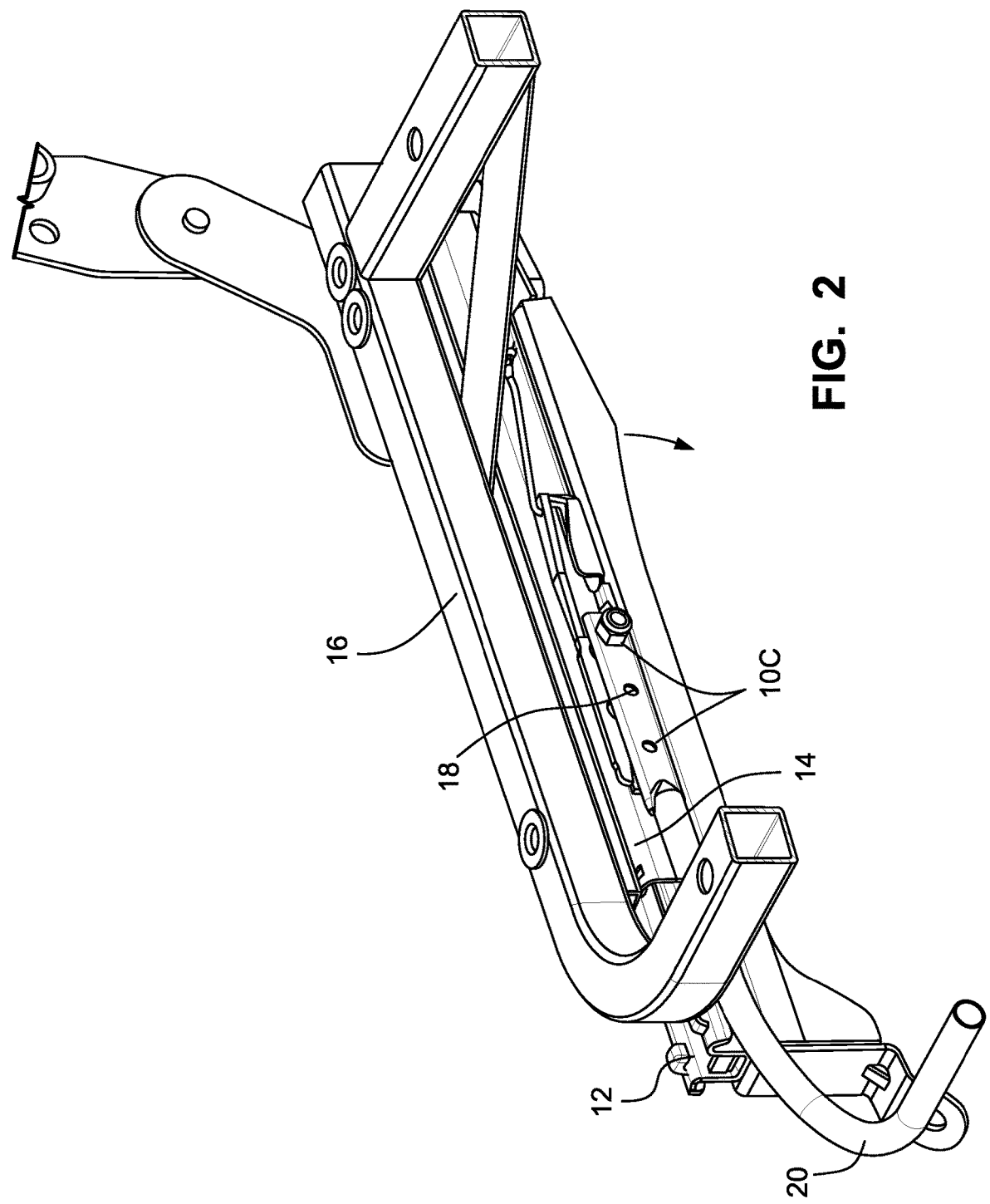
FIG. 2 is an enlarged view from FIG. 1 showing the right-hand latch of the present assembly.
Figure 3:
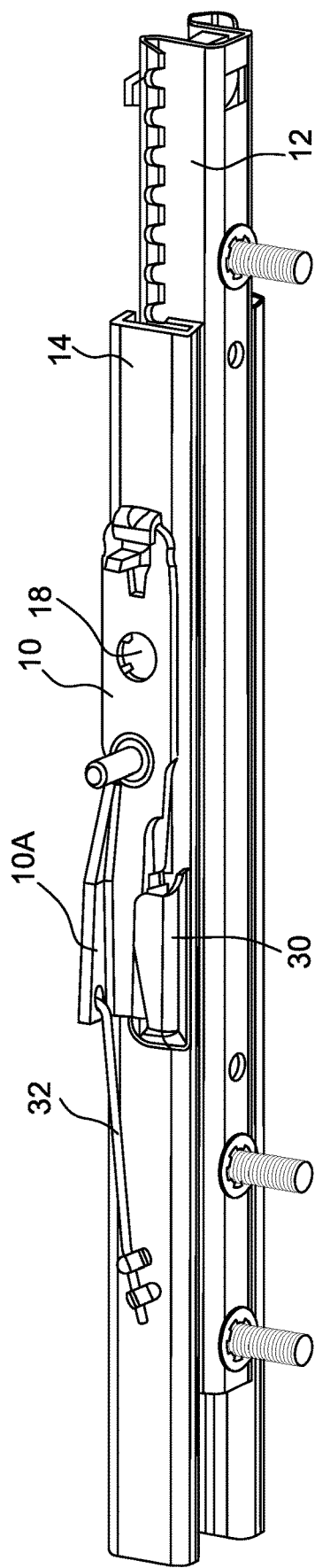
FIG. 3 is a perspective view of the upper and lower rails and latch on one side of the seat assembly.
Figure 4A:
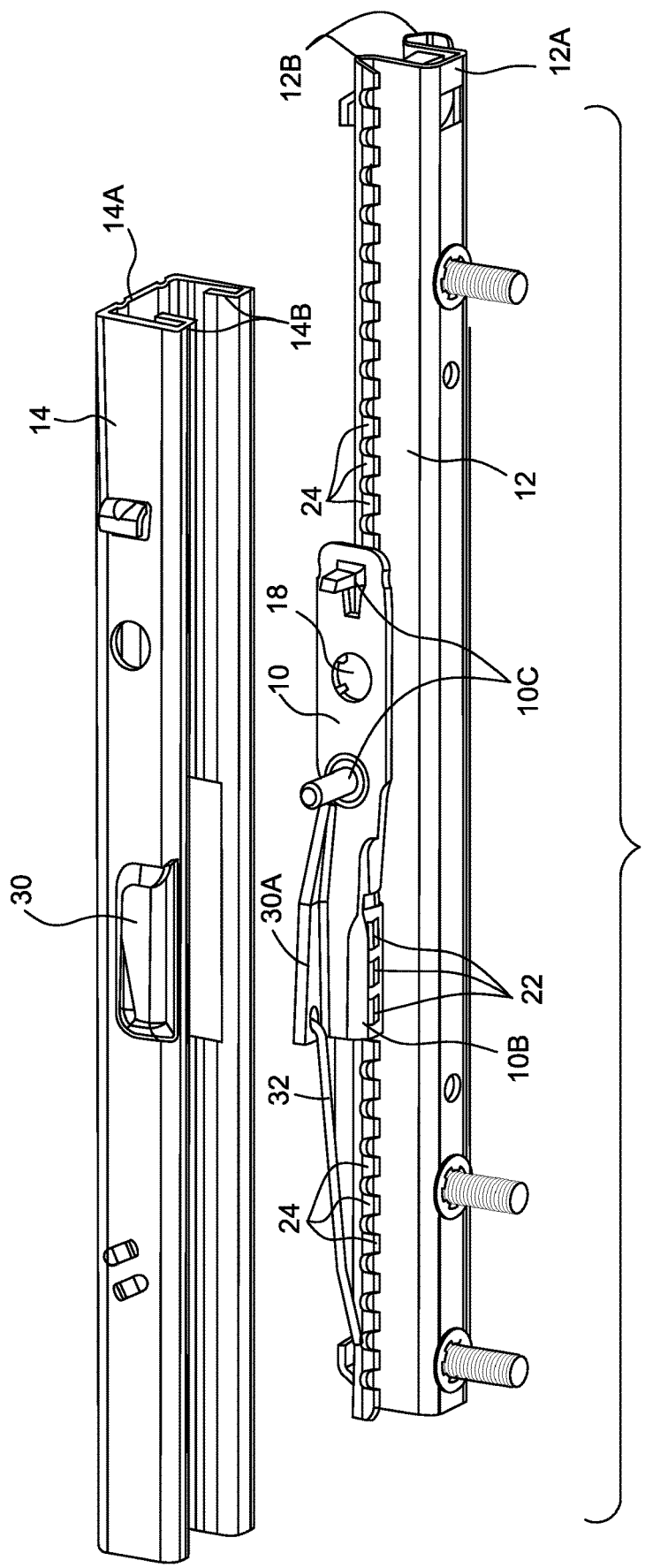
FIG. 4A is a partially exploded view of the upper and lower rails on one side of the seat adjuster assembly.
Figure 4B:
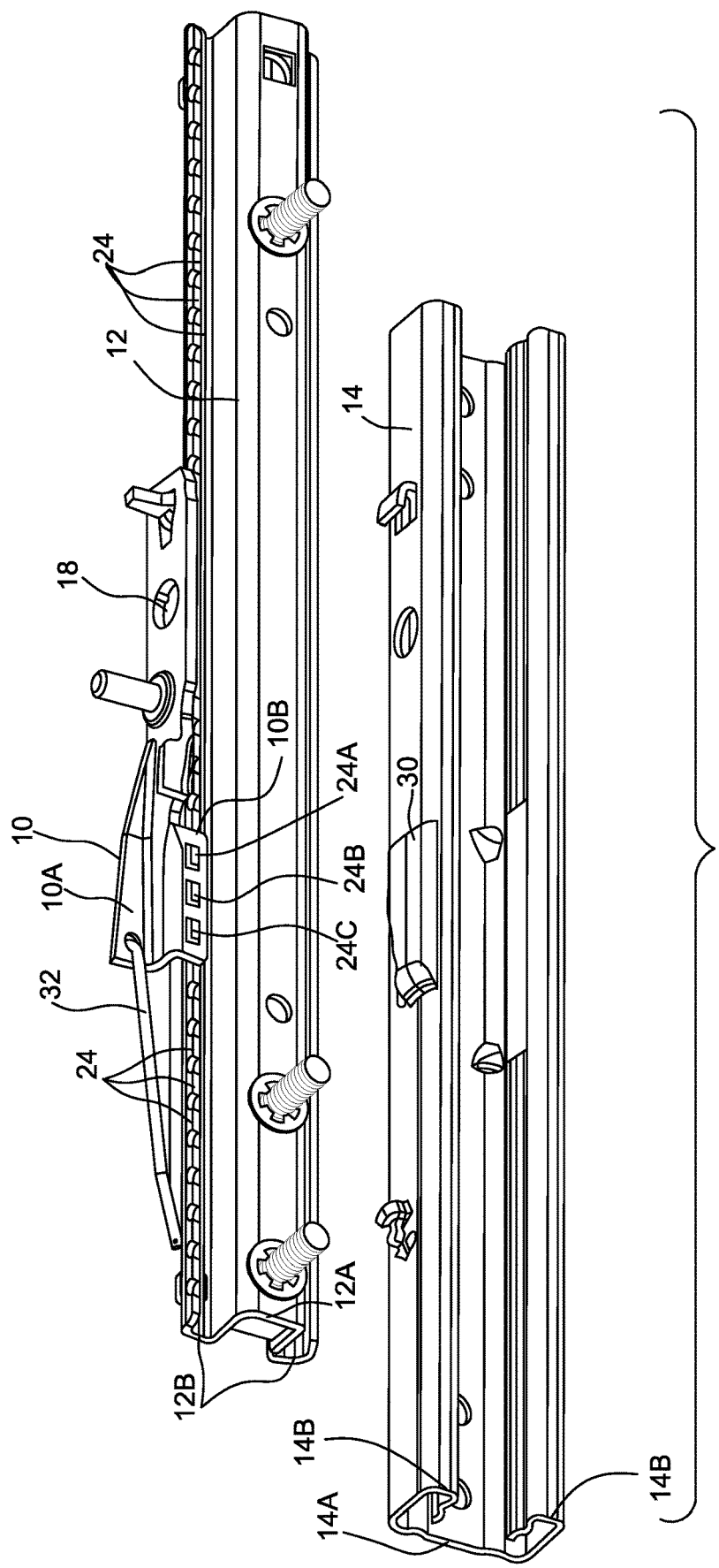
FIG. 4B is another partially exploded view of the upper and lower rails for the seat adjuster assembly.
Figure 5:
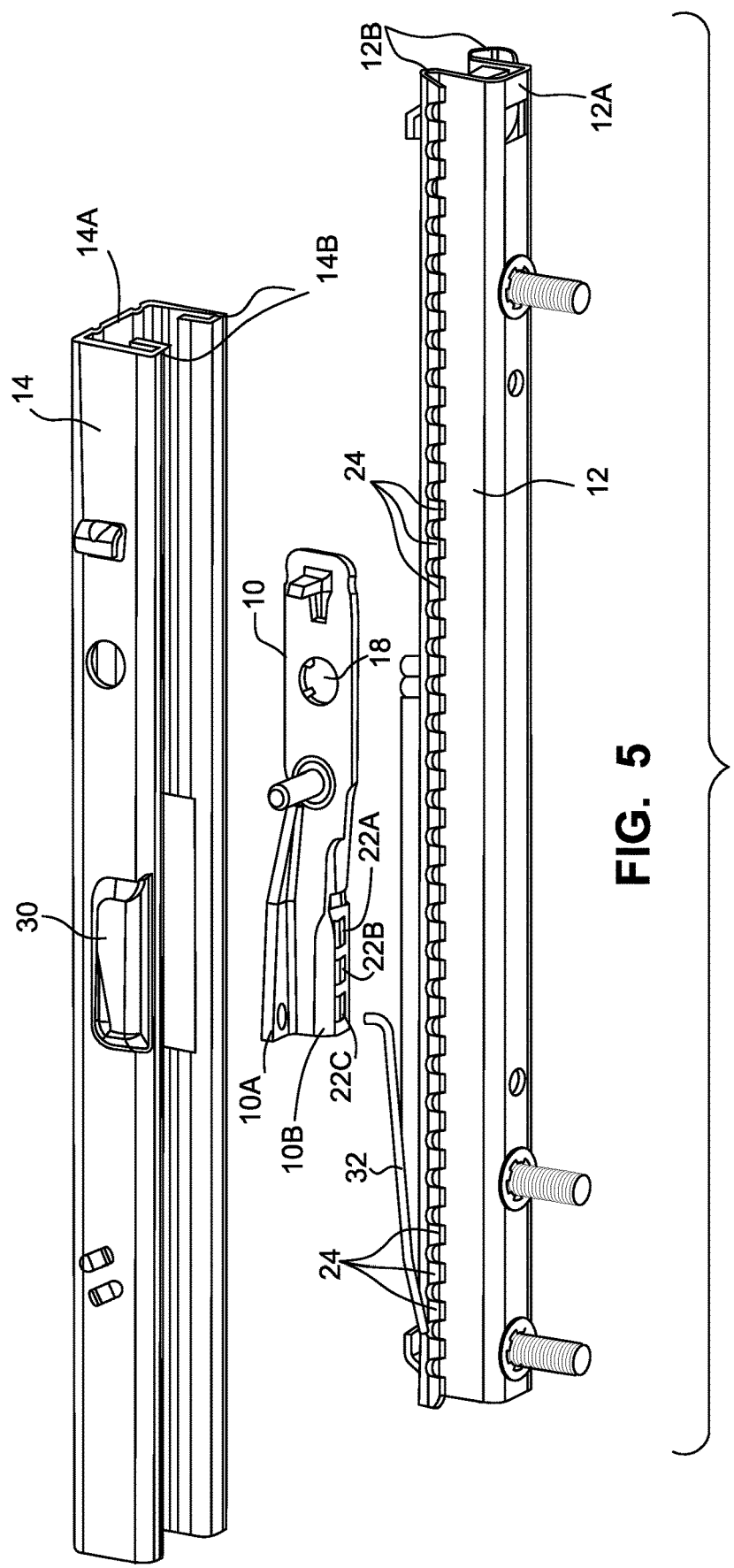
FIG. 5 is another further exploded view of the rails and latch for one side of the seat adjuster assembly.
Figure 6:
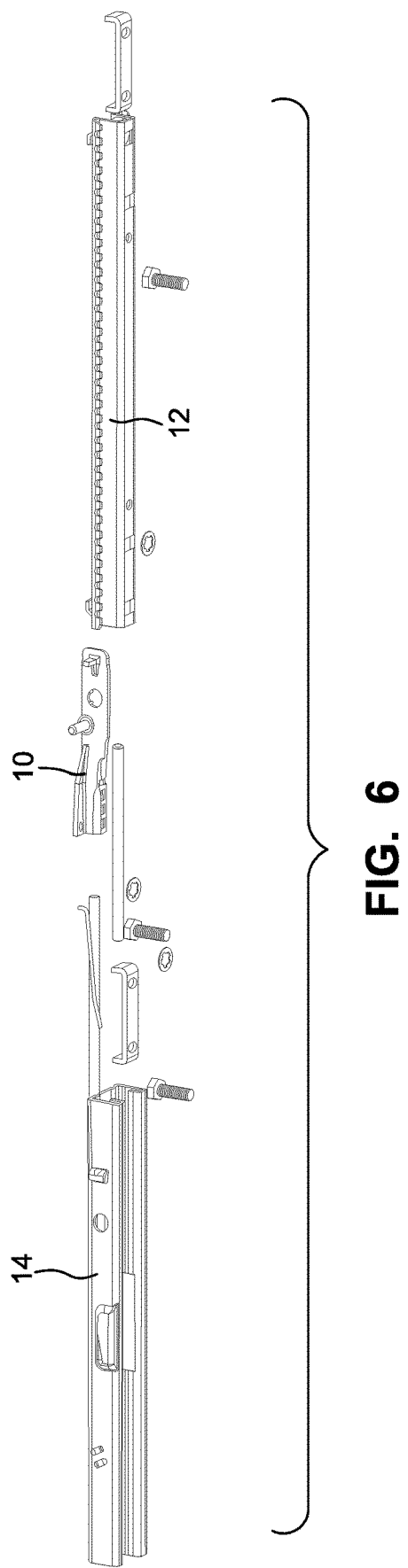
FIG. 6 is a more fully exploded view of one half of the seat adjuster assembly.
Figure 7:
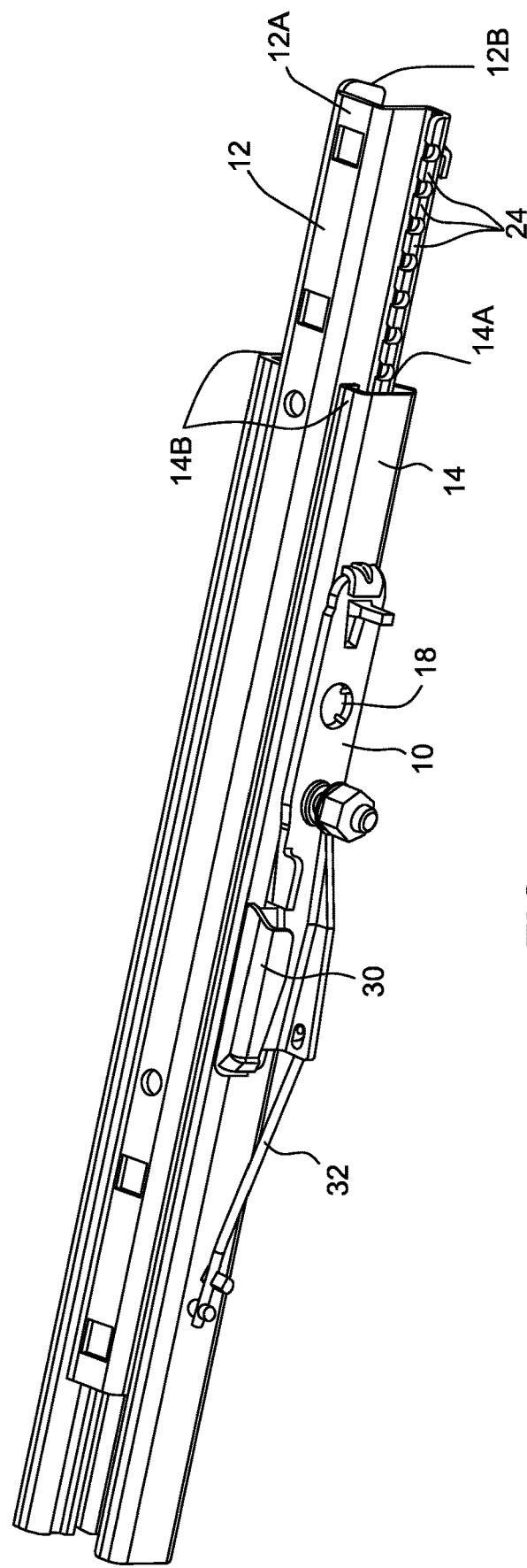
FIGS. 7 and 8 are perspective views showing one latch engaged with the teeth of one of the lower rails.
Figure 8:
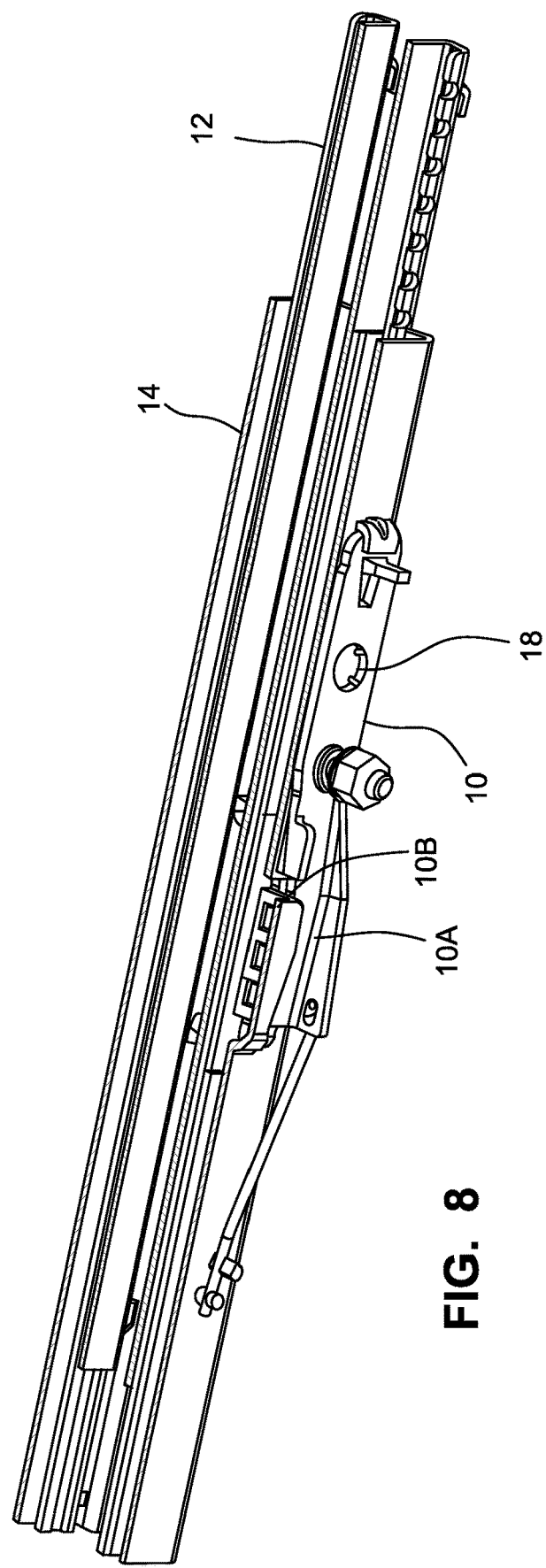
Figure 9:
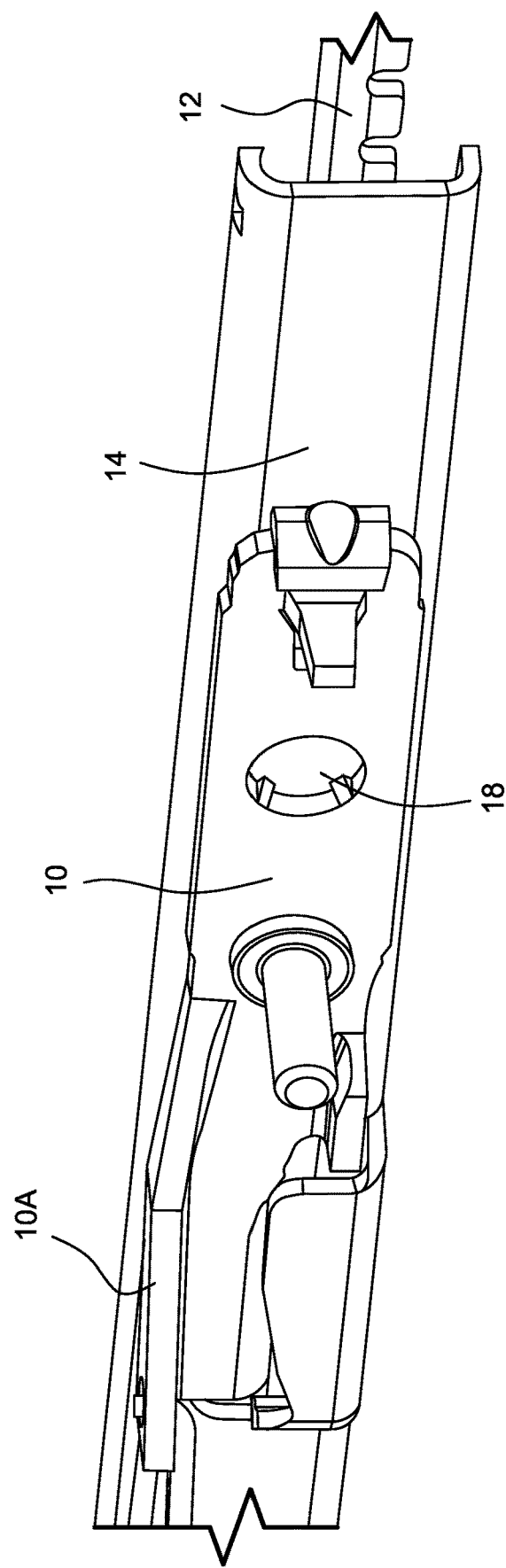
FIGS. 9 and 10 are perspective views from opposite sides showing one of the latches in a locked position.
Figure 10:
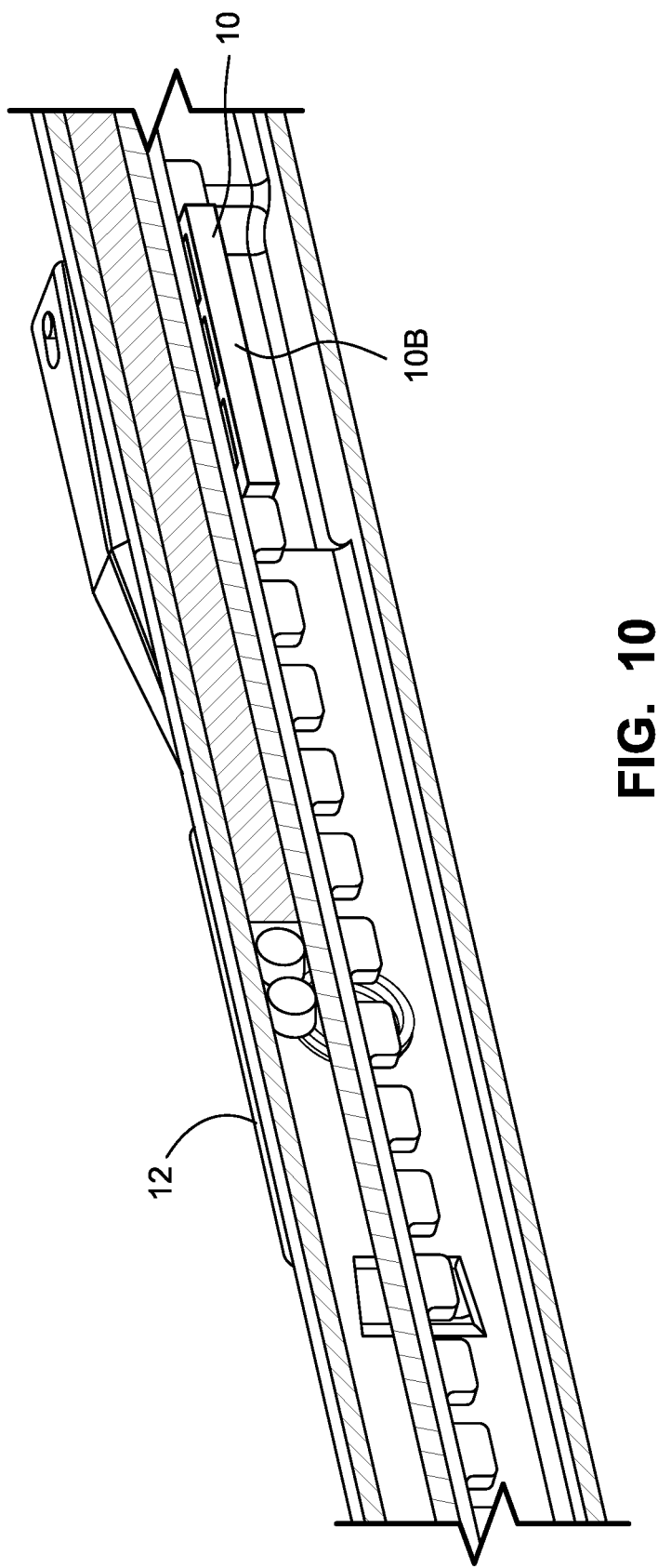
Figure 11:
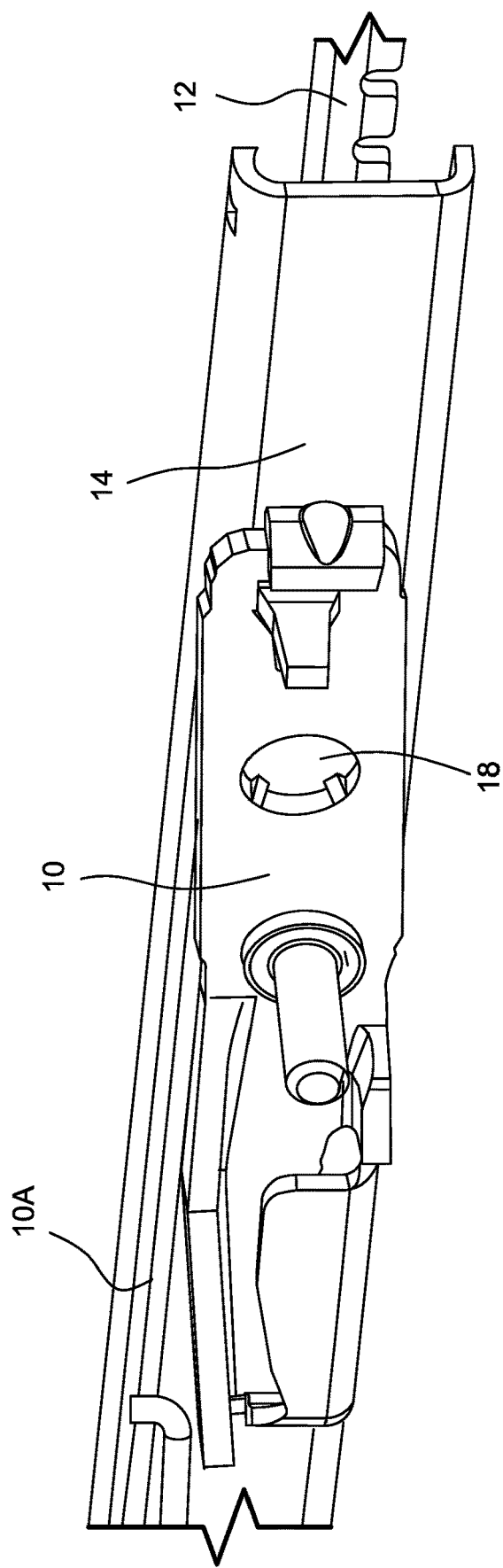
FIGS. 11 and 12 are perspective views from opposite sides showing one of the latches in an unlocked position.
Figure 12:
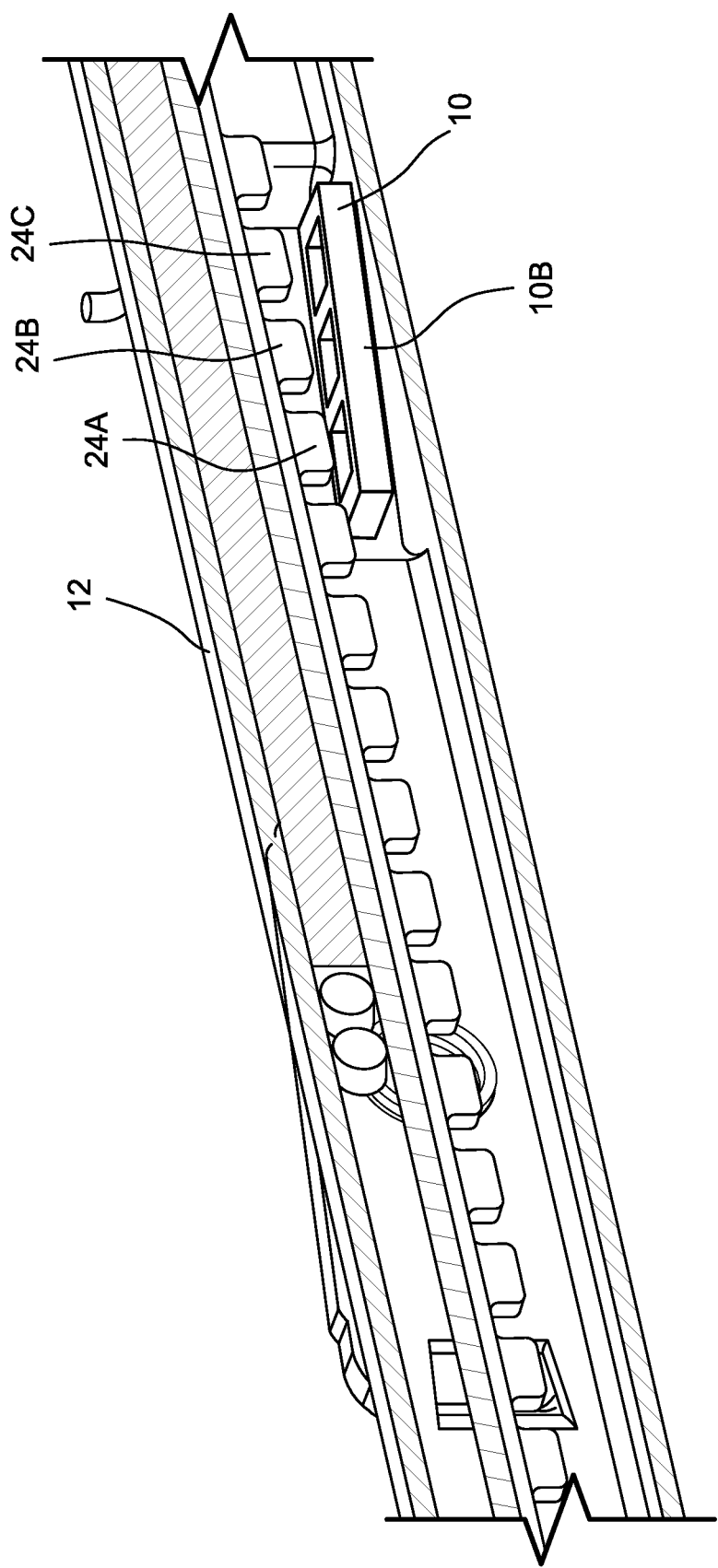
Figure 14B:
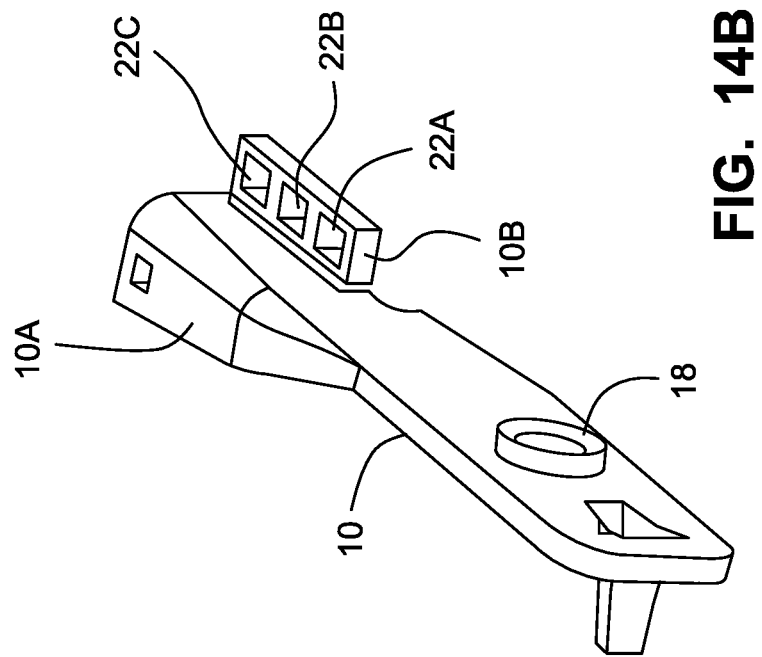
FIGS. 14A and 14B are perspective views showing a right-hand latch and a left-hand latch, respectively.
Figure 14A:
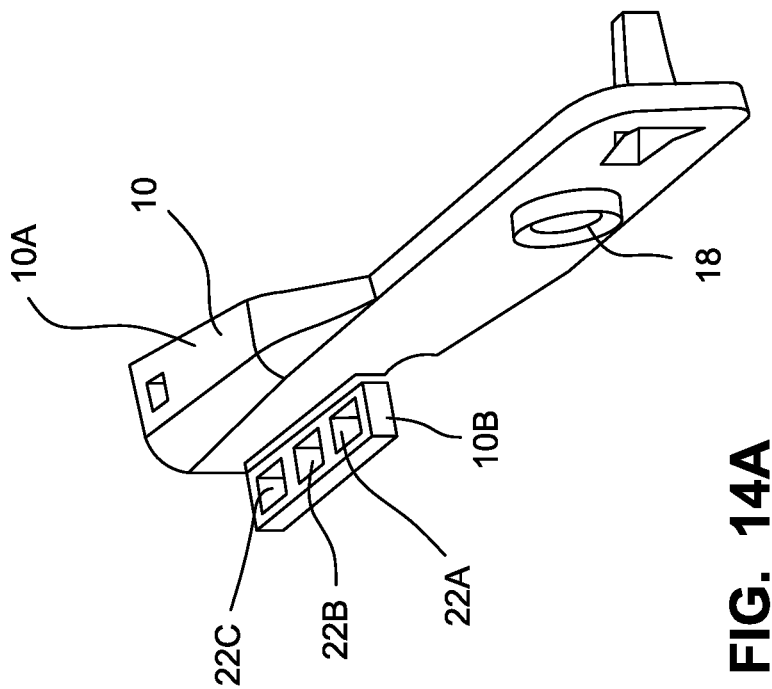

An improved latch 10 for a sliding vehicle seat will be described with reference to the drawings. A seat assembly generally includes a pair of spaced apart, left and right lower rails 12, which are secured to the vehicle floor. The seat assembly also includes a pair of left and right upper rails 14, which are slidably mounted on the lower rails 12 for forward and rearward movement. A seat base 16 is secured to the upper rails 14.

The upper rails 14 form a U-shaped channel 14A that includes return legs 14B that form smaller U-shaped channels interior to the U-shaped channel 14A. The lower rails 12 also form a U-shaped channel 12A that includes return legs 12B that conclude in downward-facing teeth 24 exterior to the U-shaped channel 12A.

When the upper rails 14 and lower rails 12 are assembled, the upper rails 14 are slidable relative to lower rails 12, and the teeth 24 are encompassed by the upper rail return legs 14B. By gravity, the return legs 12B of the lower rails 12 bear against the inner surface of the U-shaped channels 14A of the upper rails 14. The upper rails 14 may be shaped and sized to slide along the lower rails 12 without interfering with the teeth 24 or the vehicle floor. In other embodiments, the teeth may be disposed on the upper rail 14. Upper 14 and lower 12 rails may be made of lubricious material, include one or more bearings between rails, or may utilize any other known method of facilitating fore and aft sliding of the seat assembly.

The latches or latch bodies 10 are disposed on left and right sides and are pivotally mounted to the exterior of the left and right upper rails 14, respectively, for movement about a pivot emboss or axis 18 between locked and unlocked positions. A handle or lever 20 is connected to the latch bodies 10 and resides beneath a forward portion of the seat base 16 for easy gripping by a person sitting in the seat. An upward force on the handle 20 by the user subsequently pivots the latch body 10 downward at the opposite end of the pivot axis 18. In other embodiments, the handle or lever 20 could be accessed and actuated by hand at the side of the seat, or the latch mechanism could be electromechanically actuated. In further embodiments, the latching mechanism including the latch body 10 and the teeth 24 of the lower rails 12 may only be included on one side of the seat assembly, where the other side of the seat assembly has a passive or floating rails without a latching or locking mechanism. In such embodiments, the passive side of the seat assembly may utilize roll form slide tracks.

Latch bodies 10 include a lever portion 10A and an engaging portion 10B. The upper rails 14 are shown as including a slide tab 30 for limiting the downward pivoting motion of respective latch lever portions 10A when the latch bodies 10 are in the unlocked position. Upper rails 14 may also include attachment flanges for a spring wire 32 that exerts an upward force on respective latch lever portions 10A for maintaining the latch bodies 10 in the locked position when the handle 20 is relaxed and not pivoted. Latch bodies 10 may include engagement features 10C for mounting to rear portions of the handle 20 in pivotal securement. In other embodiments, the latch bodies 10 and handle 20 may be monolithic.

The lower 12 and upper 14 rails, the seat base 16, and the handle 20 are conventional in construction and may take forms different than that shown in the drawings, without departing from the scope of the described embodiments. Similarly, the pivotal connection of the latch bodies 10 to the rails 14 is conventional.

The left and right side latches 10 are mirror images of one another. The following description applies to both the left and right side latches 10.

Each latch 10 includes a plurality of openings 22 on the engaging portion 10B for engaging the teeth 24 of the lower rails 12. The openings 22 may also be referred to as pockets, holes, apertures, or windows. In one embodiment, there are three openings 22A, 22B, and 22C, though it is understood that two or more openings can be utilized on the latches 10. The openings 22A, 22B, 22C are sized to receive teeth 24A, 24B, 24C, respectively, on the lower rails 12, to lock the latches 10 in the locked position.

The dimensions of the openings or teeth apertures 22 of the latch engaging portion 10B eliminate skip-locking and chucking. More specifically, the openings 22 each have different lengths. As shown in FIG. 16B, a conventional latch engaging portion 10B has three teeth openings all having the same length. In comparison, as shown in FIG. 16A, the first or forward-most tooth opening 22A closest to the pivot axis 18 is longer than the second tooth opening 22B, which in turn is longer than the third tooth opening 22C that is furthest from the pivot axis. For example, tooth opening 22A has a preferred length of 0.303"; tooth opening 22B has a preferred length of 0.283"; and tooth opening 22C has a preferred length of 0.263", similar to the length of all three tooth openings in the conventional latch.

Figure 15:
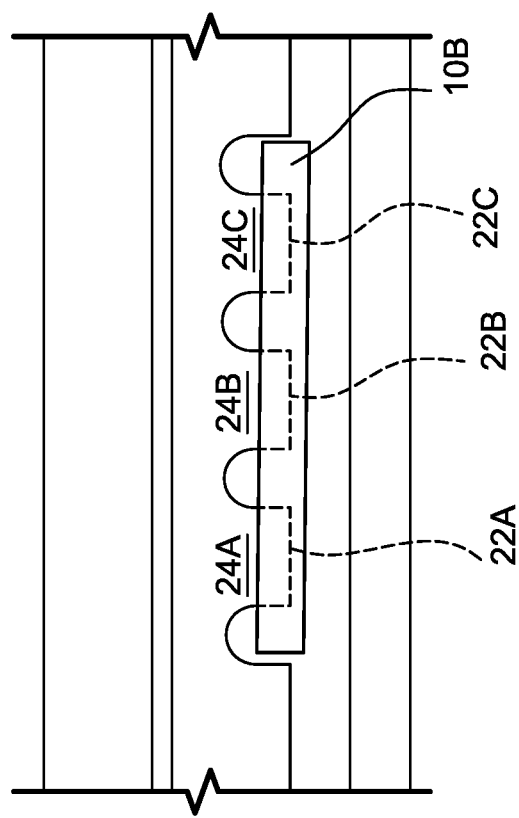
FIG. 15 is an enlarged view showing the latch holes and teeth in an intermediate position between locked and unlocked.

As shown in FIG. 13A, when the latch body 10 is in the unlocked position, the teeth 24A-24C are disengaged from the openings 22A-22C of the latch engaging portion 10B. As the latch body begins to pivot from the unlatched position toward the latched position, a first tooth 24A begins to enter the first tooth opening 22A, while the second and third teeth 24B, 24C remain outside the openings 22B, 22C. As the latch body 10 continues pivoting toward the locked position, as shown in FIG. 13C, the second tooth 24B begins to enter the second tooth opening 22B. When the latch body 10 is fully pivoted into the locked position, the teeth 24A-24C are fully inserted into the teeth openings 22A-22C, as shown in FIG. 13D. This sequential movement of the teeth 24A-24C into the latch openings 22A-22C is also illustrated in FIG. 15.

Thus, the first opening 22A is oversized, allowing the tooth 24A to catch or engage with the opening 22A more reliability under high-speed travel of the upper rails 14 along the lower rails 12 when handle 20 is actuated to pivot the latch bodies 10. This initial engagement of tooth 24A into opening 22A slows the upper rails 14 and allows the middle opening 22B to catch the tooth 24B and stop the travel of the upper rails 14 along the lower rails 12. Then, the third opening or window 22C catches the third tooth 24C and securely locks the upper rails 14 in place on the lower rails 12. The third opening 22C has relatively close tolerance with the tooth 24C, and thereby prevents the loose-feeling chucking movement between the rails 12, 14 after latching.

It is understood that the latch mechanism 10 of the described embodiments can be used in various vehicle industries, including automotive, trucking, RVs, boats and other marine vehicles, off-road vehicles, agricultural, lawn care, and other industries.

It is understood that the latch body 10 and the upper slide rails 14 are right and left side components, being mirror images of one another. The lower slide rails 12 are identical and are rotated or flipped end to end for the left and right sides of the seat assembly, which maintains the teeth 24 on the inboard side of the assembly.

In a preferred manufacturing process, the latches 10 are made via a multi-stage progressive dye stamping. The left and right side latches can be plated with different colors of plating to identify each side during transit and assembly.

Thus, the latch opening 22A closest to the pivot point 18 catches tooth 24A first, then the middle opening 22B catches the middle tooth 24B, and finally, the third opening 22C farthest from the pivot axis 18 will catch the tooth 24C to secure the latches 10 in the selected position. By increasing the size of opening or pocket 22A by a 0.040" and increasing the size of the second opening or pocket 22B by 0.020" and maintaining the third opening or pocket 22C at the standard length, the skip locking and chucking problems of the conventional latch can be eliminated. The thickness of the latch engaging portion 10B, where the openings 22A-22C are formed, may be reduced to compensate for the increased opening sizes, while maintaining material strength requirements. In other words, the thickness of the latch engaging portion 10B may be the greatest around opening 22C and the thinnest around the opening 22A, in some embodiments.

With the latches 10 of the present invention, the physical "feel" of the locking action is noticeably improved.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A latch assembly for locking a sliding seat in a selected position, the seat including a base mounted on at least one upper rail which is slidably mounted on at least one lower rail, the latch assembly comprising:

a latch body having a plurality of openings, the latch body being configured for mounting pivotally on one of the at least one upper rail and at least one lower rail; and a plurality of teeth disposed on the other of the at least one upper rail and at least one lower rail, wherein the plurality of openings sequentially receive the teeth as the latch body pivots from an unlocked position to a locked position; and wherein the openings have sequentially smaller dimensions.

2. The latch assembly of claim 1, wherein the plurality of openings comprise a first one of the openings which is greater than 5% longer than a last one of the openings.

3. The latch assembly of claim 1, wherein the latch body is configured for mounting pivotally to the at least one upper rail, and the plurality of teeth are disposed on the at least one lower rail.

4. The latch assembly of claim 1, wherein the latch body comprises an engagement portion containing the plurality of openings and a lever portion configured for limiting a pivot range of the latch body.

5. The latch assembly according to claim 4, further comprising a slide tab in the one of the at least one upper rail and at least one lower rail in which the latch body is configured for mounting pivotally, the lever portion of the latch body engaging the slide tab in the unlocked position.

6. The latch assembly of claim 1, wherein the latch body is secured to an elongated handle for pivoting the latch body between the unlocked position and the locked position.

7. The latch assembly of claim 1, wherein the latch body has three of the openings.

8. The latch assembly of claim 1, wherein the plurality of openings have uniform width and varying length.

9. The latch assembly of claim 1, wherein the latch body is biased toward the locked position.

10. A latch assembly for a sliding seat, the sliding seat including an upper rail fixed to the seat and slidably mounted on a lower rail fixed to a floor, the latch assembly comprising:

a handle; and a latch body fixed to the handle and securable pivotally to one of the upper rail and the lower rail, wherein the latch body is pivotable via the handle between a locked position and an unlocked position, the latch body including teeth openings arranged along a lengthwise dimension, wherein the teeth openings sequentially decrease in size.

11. The latch assembly of claim 10, wherein the latch body is biased toward the locked position.

12. The latch assembly of claim 10, wherein the latch body comprises engagement features to which the handle is fixed.

13. The latch assembly of claim 12, wherein the engagement features are disposed on opposite sides of a latch body pivot point.

14. The latch assembly of claim 10, wherein the handle and the latch body are monolithic.

15. The latch assembly of claim 10, wherein the latch body comprises an engagement portion containing the teeth openings and a lever portion configured for limiting a pivot range of the latch body.

16. The latch assembly according to claim 15, further comprising a slide tab in the one of the upper rail and the lower rail in which the latch body is pivotally secured, the lever portion of the latch body engaging the slide tab in the unlocked position.

17. An adjustable frame for a vehicle seat, comprising:
a lower rail having a plurality of teeth and adapted to be secured to a vehicle floor;
an upper rail slidably mounted on the lower rail;
a base fixed to the upper rail to support the vehicle seat;
a latch pivotally mounted to the upper rail, the latch having a plurality of openings to releasably receive the teeth; and
a handle connected to the latch to pivot the latch between a locked position engaging the teeth and an unlocked position disengaged from the teeth,
wherein the plurality of openings are progressively smaller in dimension.

18. The adjustable frame of claim 17, comprising three openings, wherein a largest opening is a forward-most opening.

\* \* \* \* \*